(12) United States Patent
Butts

(10) Patent No.: US 9,427,129 B2
(45) Date of Patent: Aug. 30, 2016

(54) SPRAY PATTERN ADJUSTMENT FOR MOP

(71) Applicant: Butler Home Products, LLC, Hudson, MA (US)

(72) Inventor: Mark L. Butts, Atlanta, GA (US)

(73) Assignee: Antares Capital LP, Chicago, IL (US)

( * ) Notice: Subject to any disclaimer, the term of this patent is extended or adjusted under 35 U.S.C. 154(b) by 744 days.

(21) Appl. No.: 13/651,075

(22) Filed: Oct. 12, 2012

(65) Prior Publication Data
US 2014/0103142 A1   Apr. 17, 2014

(51) Int. Cl.
| F16K 7/04 | (2006.01) |
| --- | --- |
| A47L 11/40 | (2006.01) |
| F16K 11/065 | (2006.01) |
| F16K 11/02 | (2006.01) |
| A47L 13/22 | (2006.01) |
| B05B 1/30 | (2006.01) |

(52) U.S. Cl.
CPC ............ *A47L 11/4088* (2013.01); *A47L 13/22* (2013.01); *F16K 11/027* (2013.01); *F16K 11/065* (2013.01); *B05B 1/30* (2013.01); *Y10T 137/87161* (2015.04)

(58) Field of Classification Search
CPC ...... A47L 11/4088; F16K 7/06; F16K 7/065; F16K 7/066; F16K 7/075; F16K 11/027
USPC ................ 251/4–10; 137/861–882; 222/174, 222/144.5, 214, 330; 239/288, 392, 239/436–449, 581.1, 581.2, 582.1, 447, 239/548, 550, 551, 557, 560, 562, 329–332, 239/393, 394, 532, 537, 538, 540
See application file for complete search history.

(56) References Cited

U.S. PATENT DOCUMENTS

| 3,411,534 | A | * | 11/1968 | Rose | ............................. | 137/595 |
| --- | --- | --- | --- | --- | --- | --- |
| 3,861,421 | A | * | 1/1975 | Thompson | ................ | F16K 7/06 137/636.4 |
| 3,918,490 | A | * | 11/1975 | Goda | ...................... | F16K 7/065 137/240 |
| 3,986,523 | A | * | 10/1976 | Pacht | ............................ | 137/882 |
| 4,432,472 | A | | 2/1984 | Lamm | | |
| 4,484,599 | A | * | 11/1984 | Hanover | ................. | F16K 7/065 137/595 |
| 4,602,740 | A | * | 7/1986 | Stachowiak | ........... | B08B 3/028 137/882 |
| 5,368,202 | A | | 11/1994 | Smrt | | |
| 6,554,806 | B2 | * | 4/2003 | Butterfield et al. | .......... | 604/248 |
| 6,589,197 | B1 | * | 7/2003 | Doi | ........................ | A61M 1/28 137/862 |
| 6,935,531 | B1 | * | 8/2005 | Clayton | ................ | F41B 9/0018 222/330 |
| 6,976,644 | B2 | | 12/2005 | Troudt | | |
| 7,040,510 | B1 | | 5/2006 | Hester | | |
| 2002/0011531 | A1 | * | 1/2002 | DiMaggio | ............. | B05B 9/0861 239/337 |
| 2005/0053501 | A1 | * | 3/2005 | Akahori | .................. | F16K 7/065 417/474 |
| 2005/0098577 | A1 | * | 5/2005 | Huy | ...................... | F41B 9/0031 222/79 |
| 2010/0087792 | A1 | * | 4/2010 | Nielsen | ............... | A61M 3/0295 604/328 |

* cited by examiner

Primary Examiner — Len Tran
Assistant Examiner — Alexander Valvis
(74) Attorney, Agent, or Firm — McCarter & English, LLC

(57) ABSTRACT

A sprayer assembly that includes a reservoir for storing liquid, a pump in fluid communication with the reservoir, first and second supply tubes in fluid communication with the pump wherein the pump is configured to draw liquid from the reservoir and discharge the liquid into the first and second supply tubes, a first nozzle in fluid communication with the first supply tube, a second nozzle in fluid communication with the second supply tube, and a collar having at least one protrusion and rotatable between a first position in which the at least one protrusion pinches closed the first supply tube but not the second supply tube, and a second position in which the at least one protrusion pinches closed the second supply tube but not the first supply tube.

19 Claims, 14 Drawing Sheets

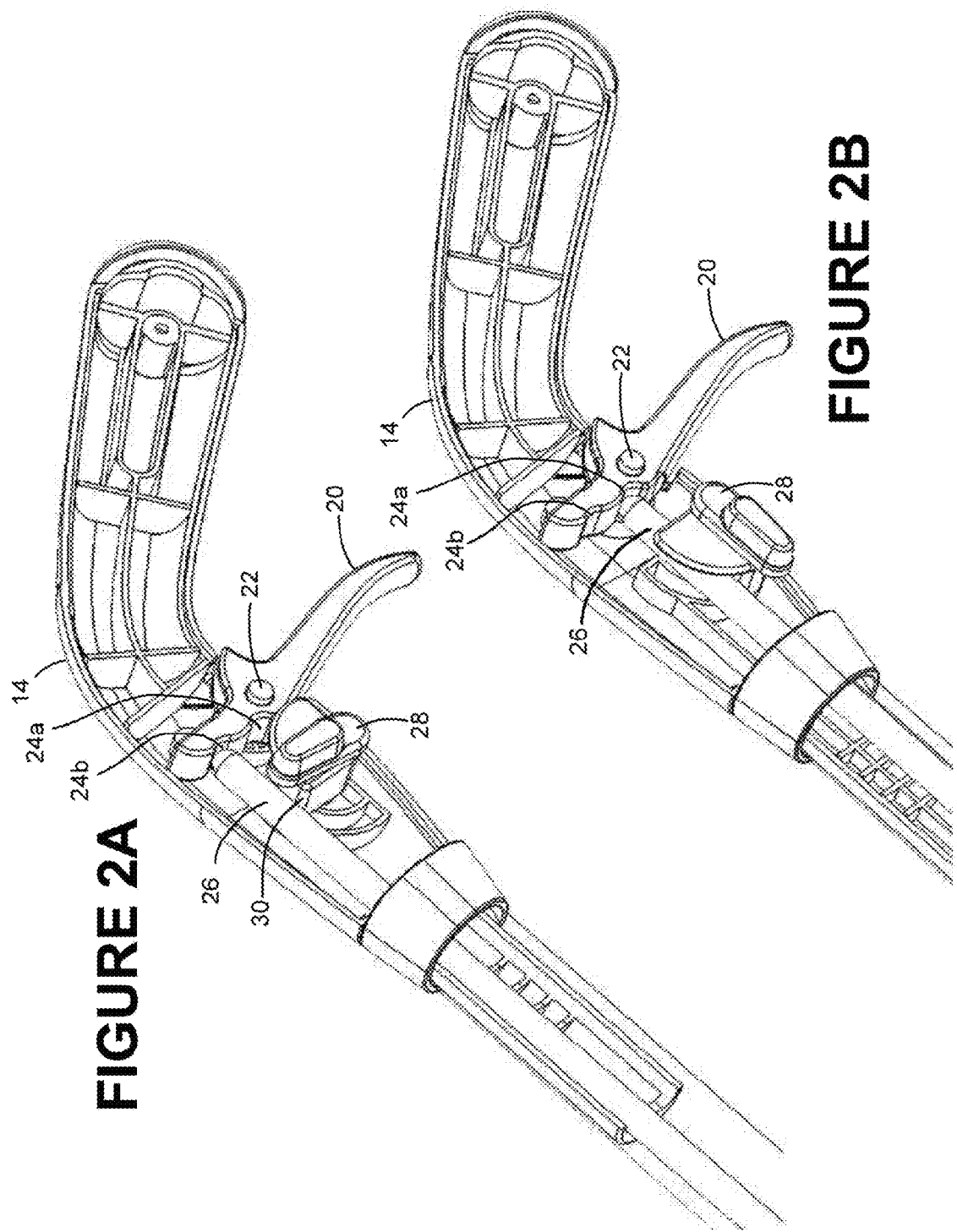

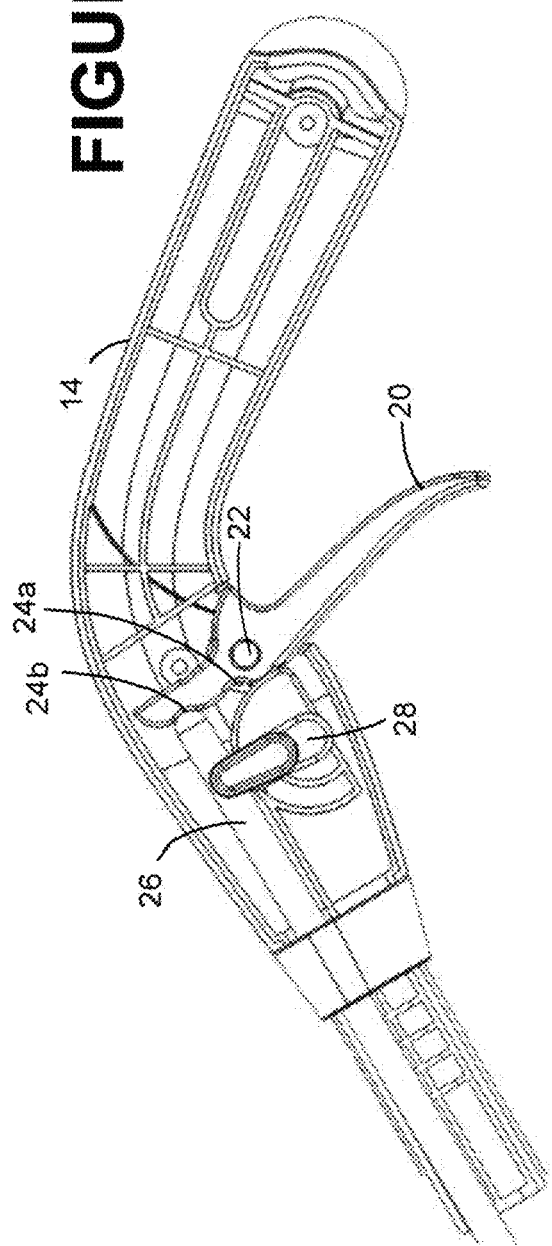
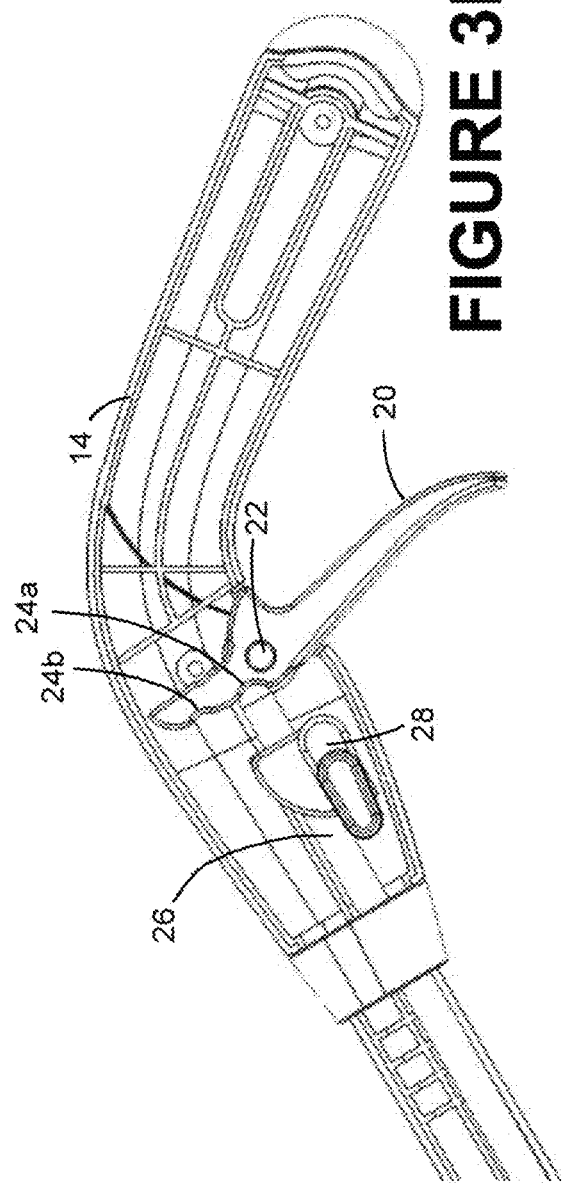

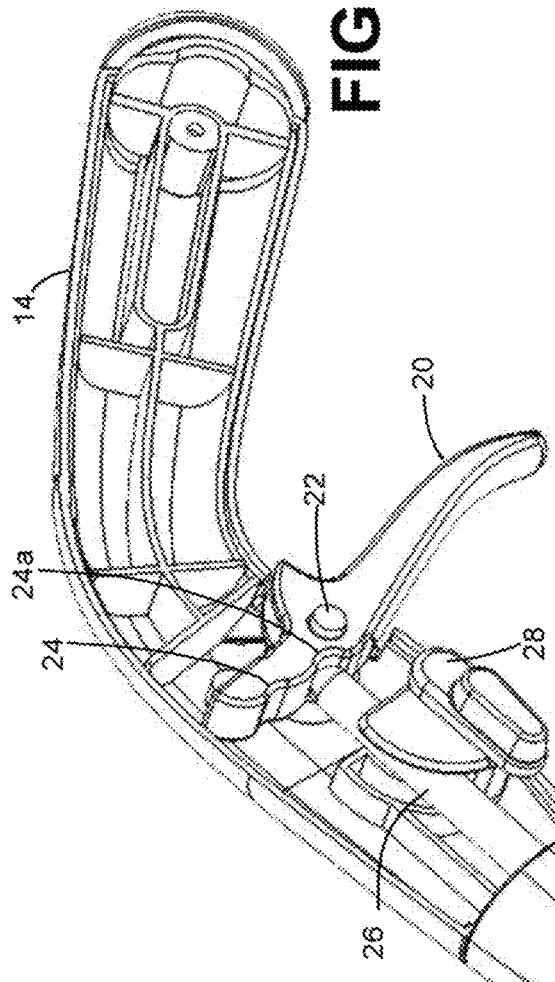
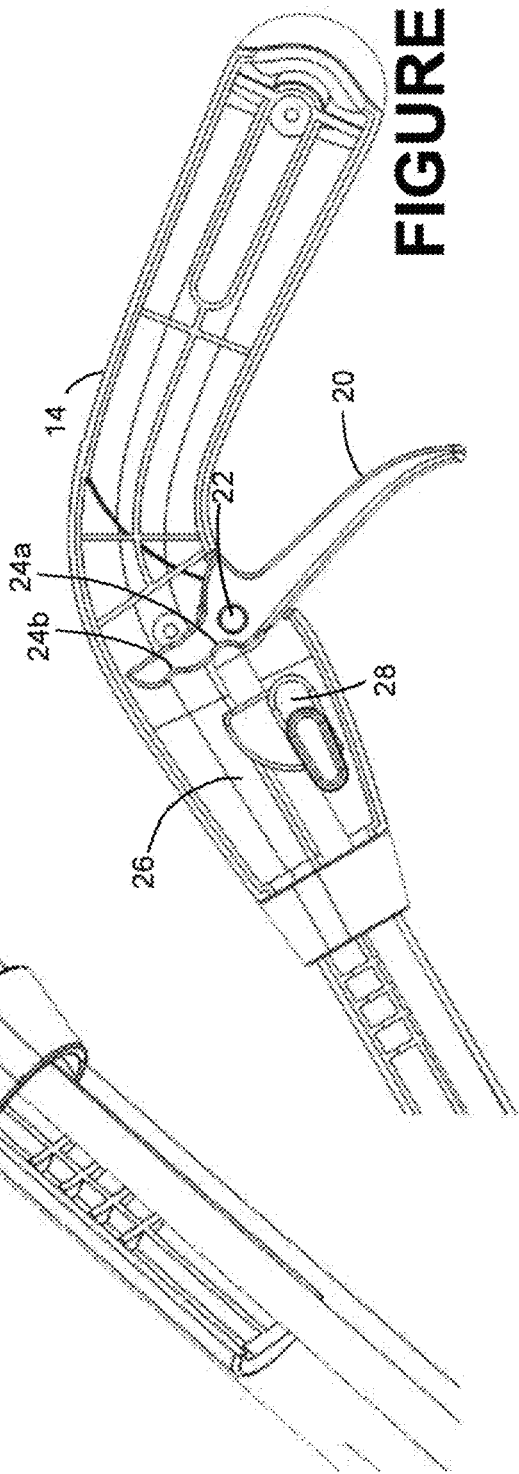

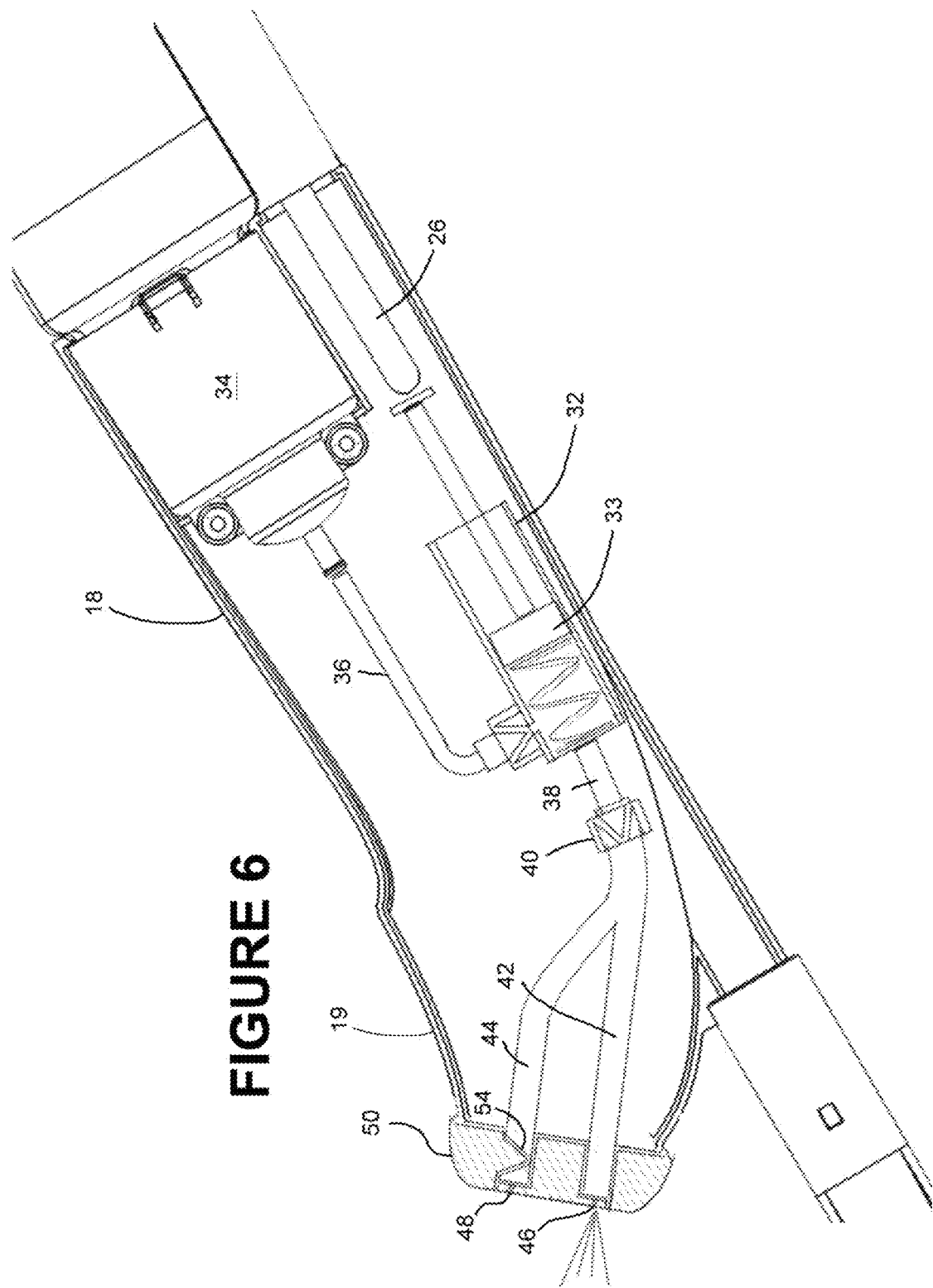

SPRAY PATTERN ADJUSTMENT FOR MOP

RELATED APPLICATIONS

This application claims the benefit of U.S. Provisional Application No. 61/546,911, filed Oct. 13, 2011, and which is incorporated herein by reference.

FIELD OF THE INVENTION

The present invention relates to a spray mop, and more particularly to a spray mop in which the pattern of spray dispensed can vary.

BACKGROUND OF THE INVENTION

Remotely activated sprayers are known. For example, U.S. Pat. Nos. 4,432,472, 5,368,202, 6,976,644 and 7,040,510 disclose mounting spray devices on one end of a shaft and remotely activating the spray device from the other end of the shaft. The U.S. Pat. No. 4,432,472 discloses a buffer at the distal end of the shaft, along with a chain connected thereto that extends to the proximate end of the shaft for operating the spray device remotely. The U.S. Pat. Nos. 5,368,202, 6,976,644 and 7,040,510 disclose a trigger lever at the proximal end (i.e. user's handle end) of the shaft, which when activated (moved) by the user causes the spray device at the other end of the pole to emit a liquid spray. The use of such trigger levers to remotely trigger a spray device at the other end of the shaft which also contains a cleaning device such as a broom or mop is also known (i.e. spray mop).

One issue with conventional spray mops is the user's need to control the pattern of spray emitted by the spray device each time the lever is activated. For some applications, the user may wish to use a narrow, focused pattern. For other applications, the user may wish to use a wide, dispersed pattern. For still other applications, the user may wish to use both. Conventional spray devices include a pattern adjustment, but they typically utilize a single nozzle (with adjustments made to that single nozzle), with mixed results in terms of quality of spray pattern, reliability, ease of use, and ease of manufacture.

There is a need for a convenient adjustment mechanism for adjusting the pattern of liquid that is released by the spray device, which is reliable, easy to use, and easy to manufacture.

BRIEF SUMMARY OF THE INVENTION

The aforementioned problems and needs are addressed by a sprayer assembly that includes a reservoir for storing liquid, a pump in fluid communication with the reservoir, first and second supply tubes in fluid communication with the pump wherein the pump is configured to draw liquid from the reservoir and discharge the liquid into the first and second supply tubes, a first nozzle in fluid communication with the first supply tube, a second nozzle in fluid communication with the second supply tube, and a collar having at least one protrusion and rotatable between a first position in which the at least one protrusion pinches closed the first supply tube but not the second supply tube, and a second position in which the at least one protrusion pinches closed the second supply tube but not the first supply tube.

In another aspect of the present invention, a sprayer assembly includes a reservoir for storing liquid, a pump in fluid communication with the reservoir, an output tube in fluid communication with the pump wherein the pump is configured to draw liquid from the reservoir and discharge the liquid into the output tube, first and second supply tubes in fluid communication with the output tube, a first nozzle in fluid communication with the first supply tube, a second nozzle in fluid communication with the second supply tube, and a collar having first and second protrusions and rotatable between a first position in which the first protrusion pinches closed the first supply tube, and a second position in which the second protrusion pinches closed the second supply tube.

Other objects and features of the present invention will become apparent by a review of the specification, claims and appended figures.

BRIEF DESCRIPTION OF THE DRAWINGS

FIG. 2A is a perspective view of the interior of the handle assembly, with the rod positioned on the engagement surface for high volume spray.

FIG. 2B is a perspective view of the interior of the handle assembly, with the rod positioned on the engagement surface for low volume spray.

FIG. 3A is a side view of the interior of the handle assembly, with the rod positioned on the engagement surface for high volume spray.

FIG. 3B is a side view of the interior of the handle assembly, with the rod positioned on the engagement surface for low volume spray.

FIG. 5A is a perspective view of the interior of the handle assembly, with the rod positioned on the engagement surface for low volume spray.

FIG. 5B is a side view of the interior of the handle assembly, with the rod positioned on the engagement surface for low volume spray.

FIG. 6 is a side view of the interior of the spray device assembly.

DETAILED DESCRIPTION OF THE INVENTION

Figure 1:
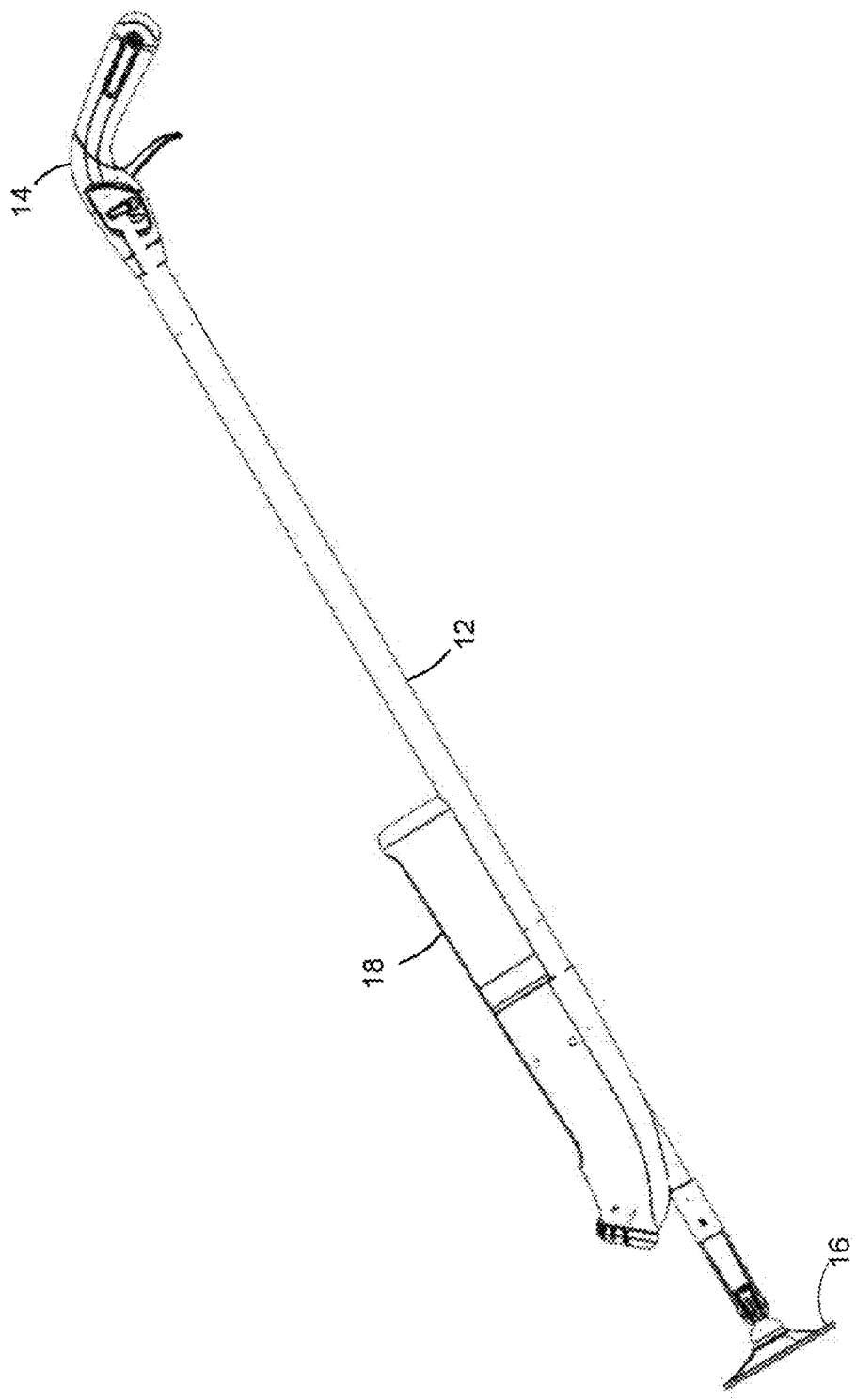
FIG. 1 is a side view of the spray mop.
Figures 4A, 4B:
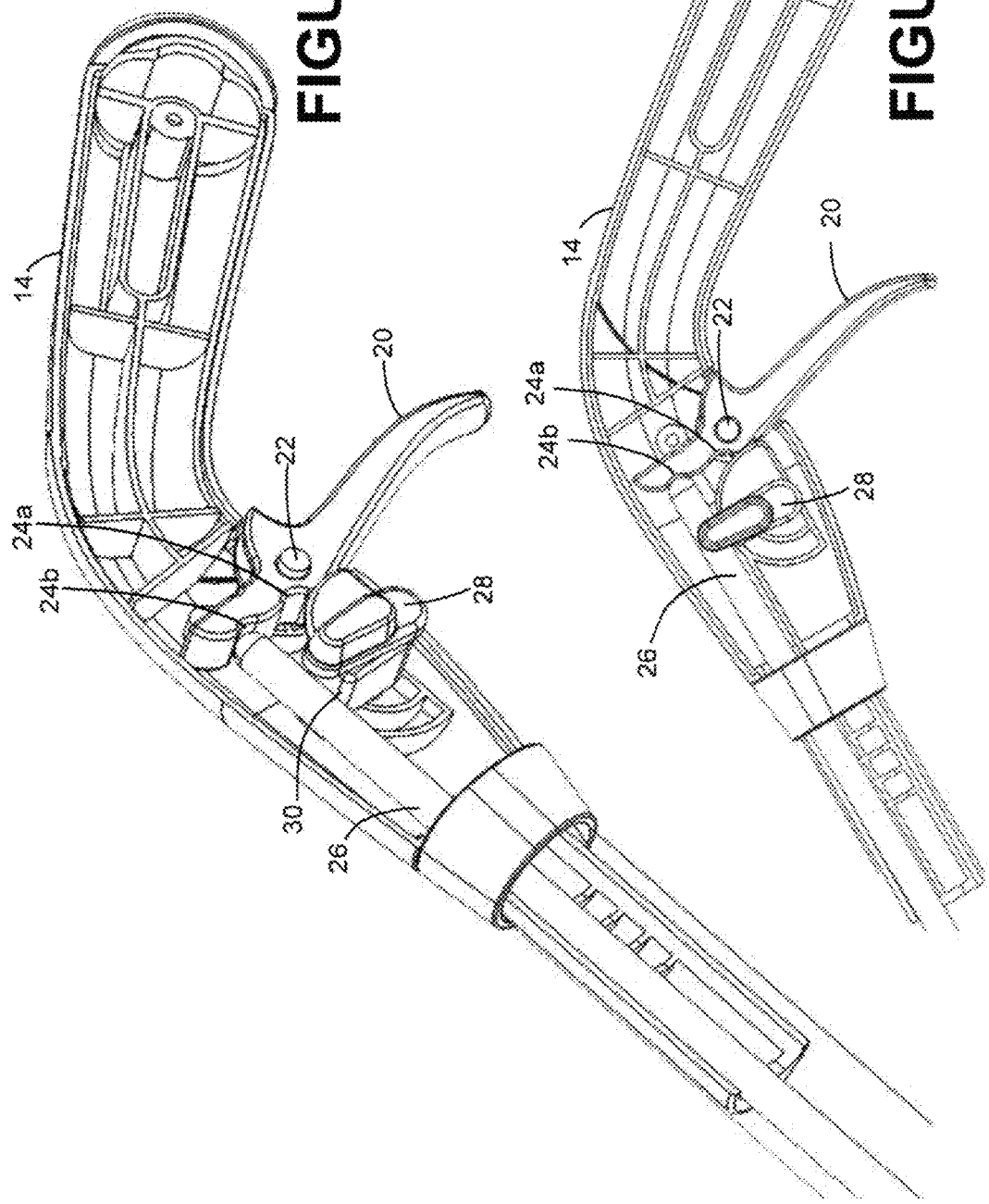
FIG. 4A is a perspective view of the interior of the handle assembly, with the rod positioned on the engagement surface for high volume spray.
FIG. 4B is a side view of the interior of the handle assembly, with the rod positioned on the engagement surface for high volume spray.

The present invention is a spray mop, as shown in FIG. 1. The spray mop includes a shaft 12 terminating at a proximal end with a handle assembly 14 and at a distal end with a cleaning element 16. A spray device assembly 18 is mounted to the shaft 12 closer to the distal end of shaft 12.

The handle assembly 14 include a lever 20 that is rotatable (i.e. by a user) about a pivot point 22, as best illustrated in FIGS. 2A and 2B. The lever 20 includes multiple concave engagement surfaces 24 (two such surfaces 24*a* and 24*b* illustrated in the figures). A rod 26 is slidably mounted in shaft 12, and selectively engages with engagement surfaces 24*a*/24*b*. When the user rotates lever 20, the lever 20 pushes on rod 26, causing rod 26 to slide toward the distal end of shaft 12 (to operate the spray device assembly as described below).

The handle assembly 14 includes a mode control knob 28 that dictates the amount of longitudinal movement the rod 26 experiences as the user rotates lever 20 through its full range of motion (and thus dictates the volume of liquid sprayed during a single operation of the lever). Specifically, the mode control knob 28 controls the position of engagement of the rod 26 on the lever 20 (i.e. which concave engagement surface 24*a*/24*b* is engaged with rod 26). The mode control knob 28 has a cam surface 30 that engages with the side surface of rod 26. When the control knob 28 is rotated, the cam surface transversely moves the proximal end of rod 26 between engagement surface 24*a* and engagement surface 24*b*. With the mode control knob 28 rotated to its low spray volume position (see FIGS. 2B, 3B, 5A, 5B), the proximal end of the rod 26 is positioned on engagement surface 24*a*, which is closer to pivot point 22 and thus results in a smaller longitudinal displacement of the rod 26 (for a smaller volume of spray) as the lever 20 is moved through its range of motion. With the mode control knob 28 rotated to its high spray volume position (see FIGS. 2A, 3A, 4A, 4B), the proximal end of the rod 26 is positioned on the engagement surface 24*b*, which is further away from pivot point 22 and thus results in a greater longitudinal displacement of the rod 26 (for a greater volume of spray) as the lever 20 is moved through the same range of motion.

The distal end of rod 26 is aligned to and operates a pump 32 as it is longitudinally moved by lever 20, as shown in FIG. 6. Pump 32 includes a plunger 33 that, when compressed by the longitudinal movement of rod 26, draws liquid from a reservoir 34 via intake tube 36, and discharges the liquid into output tube 38. The amount of liquid discharged is a function of the displacement of the pump plunger (and therefore a function of the movement of rod 26). The discharged liquid is delivered to discharge jets as described below that spray liquid from assembly 18 and to the area being cleaned.

The liquid is consistently and continually discharged by pump 18 (and therefore consistently and continually sprayed from assembly 18) throughout the entire travel of the lever 20. However, the volume of liquid discharged and sprayed through that single activation of the lever 20 can be varied by operating the mode control knob 28 without changing the fact that liquid is being continuously sprayed (i.e. the amount of lever arm travel need not be changed, just the rate/volume of liquid being sprayed during the travel). Additionally, the amount of spray volume can be adjusted at the handle assembly 14, instead of down at the sprayer device assembly, which is convenient for the user. While the preferred embodiment includes two positions of the rod engagement on the handle lever as dictated by the mode control knob (i.e. two concave engagement surfaces 24*a*/24*b*), there could be more than two positions if desired.

As illustrated in FIG. 6, a one-way valve 40 is disposed along output tube 38. Output tube 38 then divides into or is coupled to two separate supply tubes 42 and 44 each made of soft compressible tubing. The supply tubes 42/44 each terminate at a spray nozzle 46 or 48. Spray nozzles 46 and 48 have spray patterns that differ from each other (e.g. narrow stream and horizontally extending spray). While the preferred embodiment has two supply tubes and two nozzles, more than two supply tubes and nozzles can be used.

While both supply tubes 42/44 are pressurized with liquid by the operation of pump 32, the operation of nozzles 46/48 can be selectively blocked. Specifically, a rotatable collar 50 is used to selective pinch and occlude one of the supply tubes 42/44, thereby selecting the other supply line and associated nozzle for use. Therefore, as illustrated in FIG. 6, supply tube 44 is pinched by collar 50, thereby preventing liquid from reaching nozzle 48. With the collar rotational position of FIG. 6, liquid only dispenses from nozzle 46 when pump 32 is operated.

Figure 7:
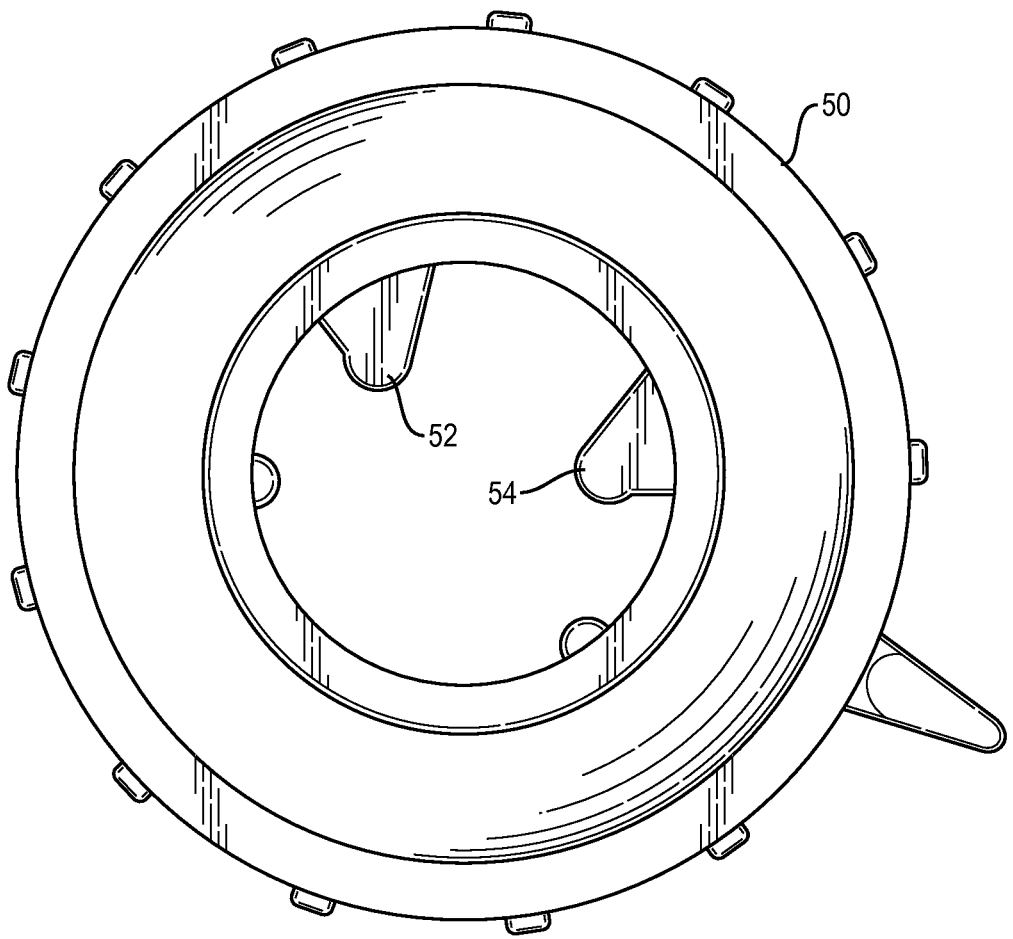
FIG. 7 is a rear view of the rotatable collar.
Figure 8:
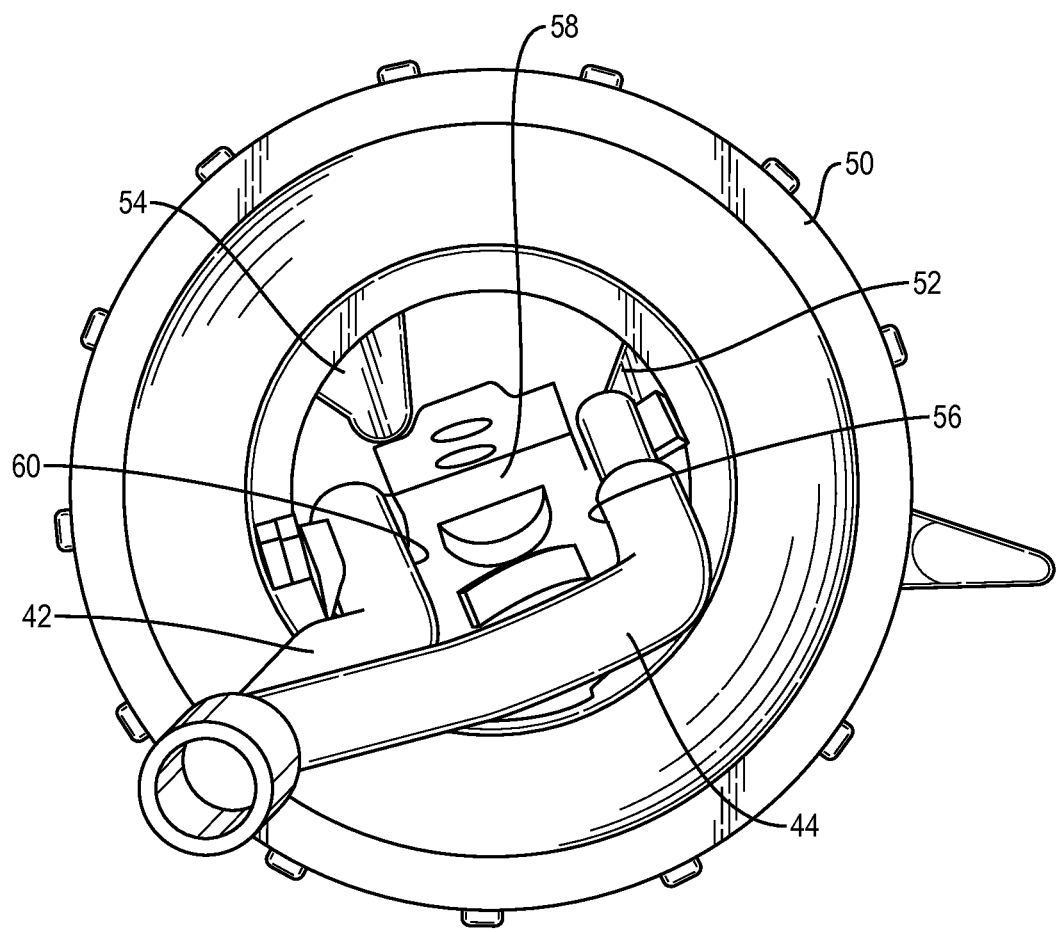
FIG. 8 is a rear view of the rotatable collar, support block and supply tubes.
Figure 9:
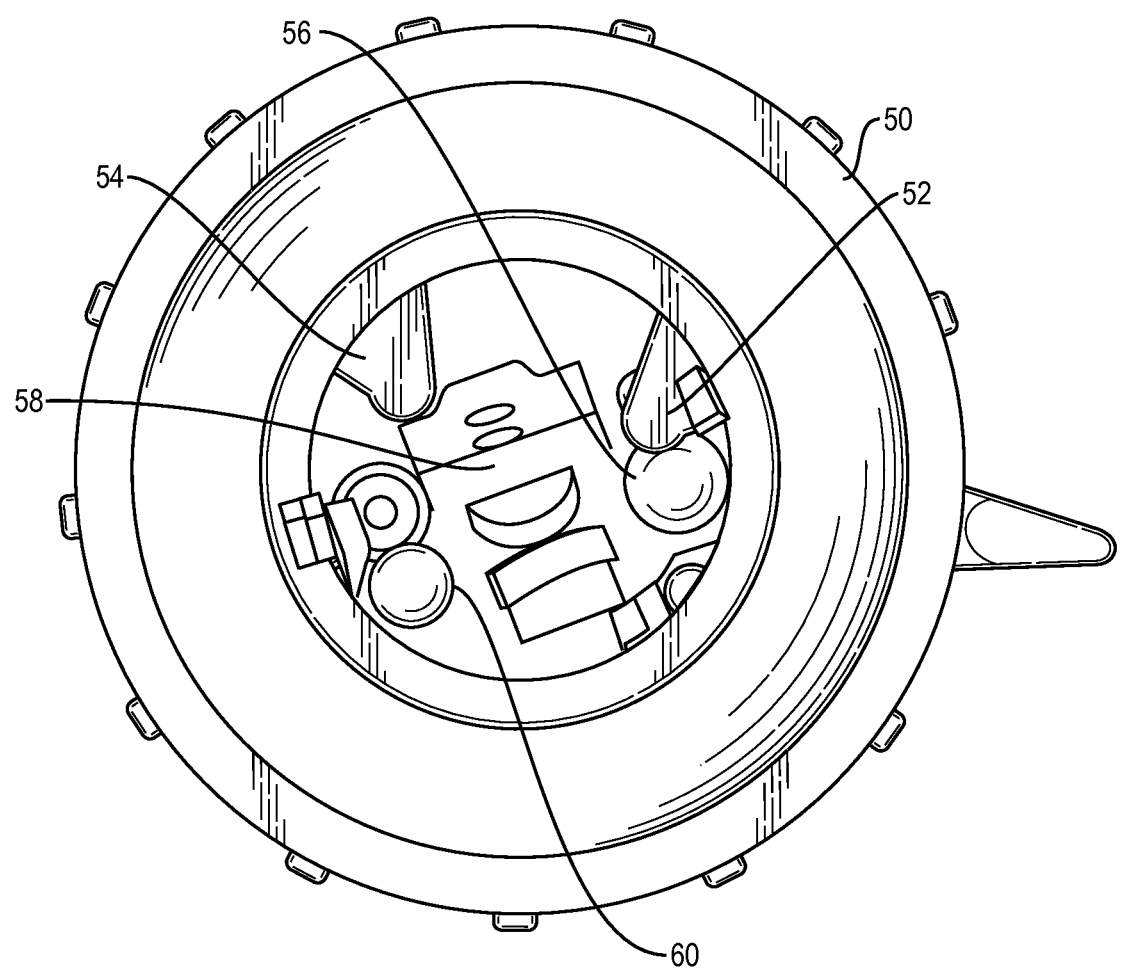
FIG. 9 is a rear view of the rotatable collar and support block.
Figure 10:
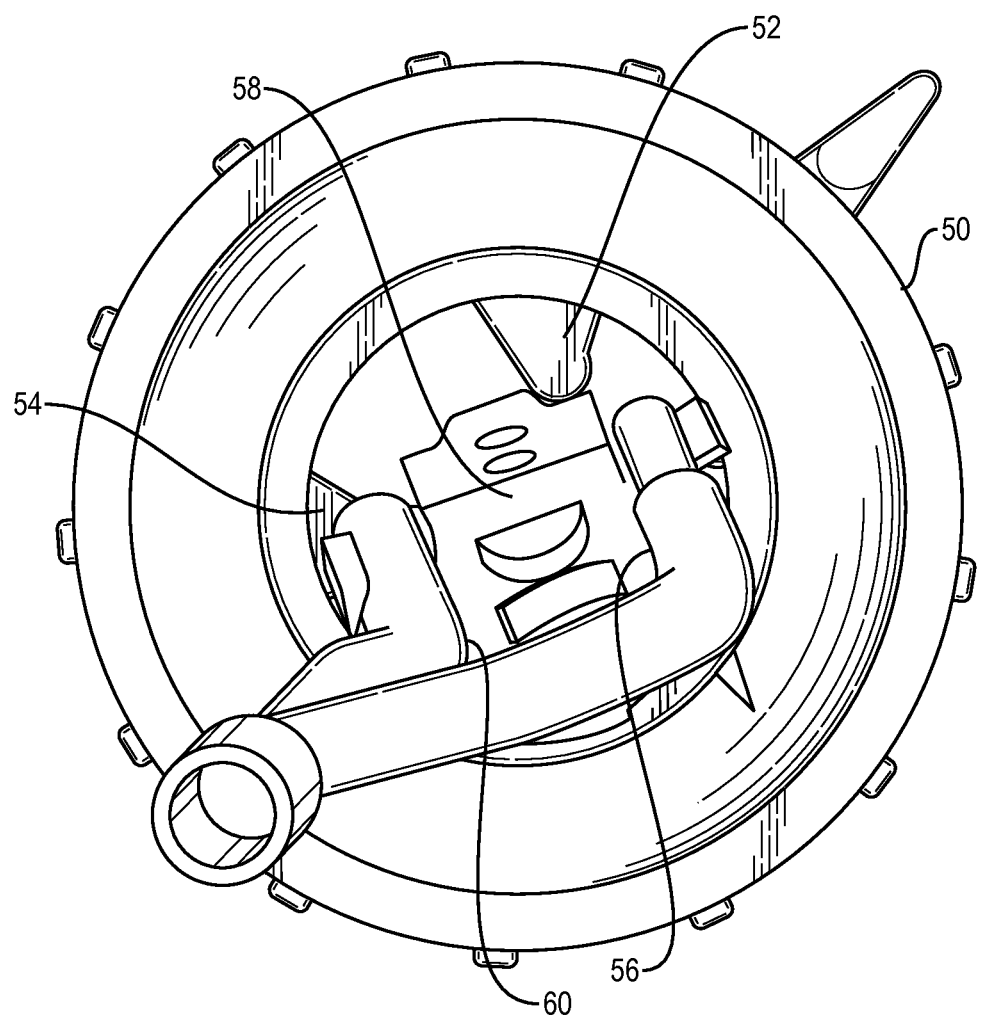
FIG. 10 is a rear view of the rotatable collar, support block and supply tubes.
Figure 11:
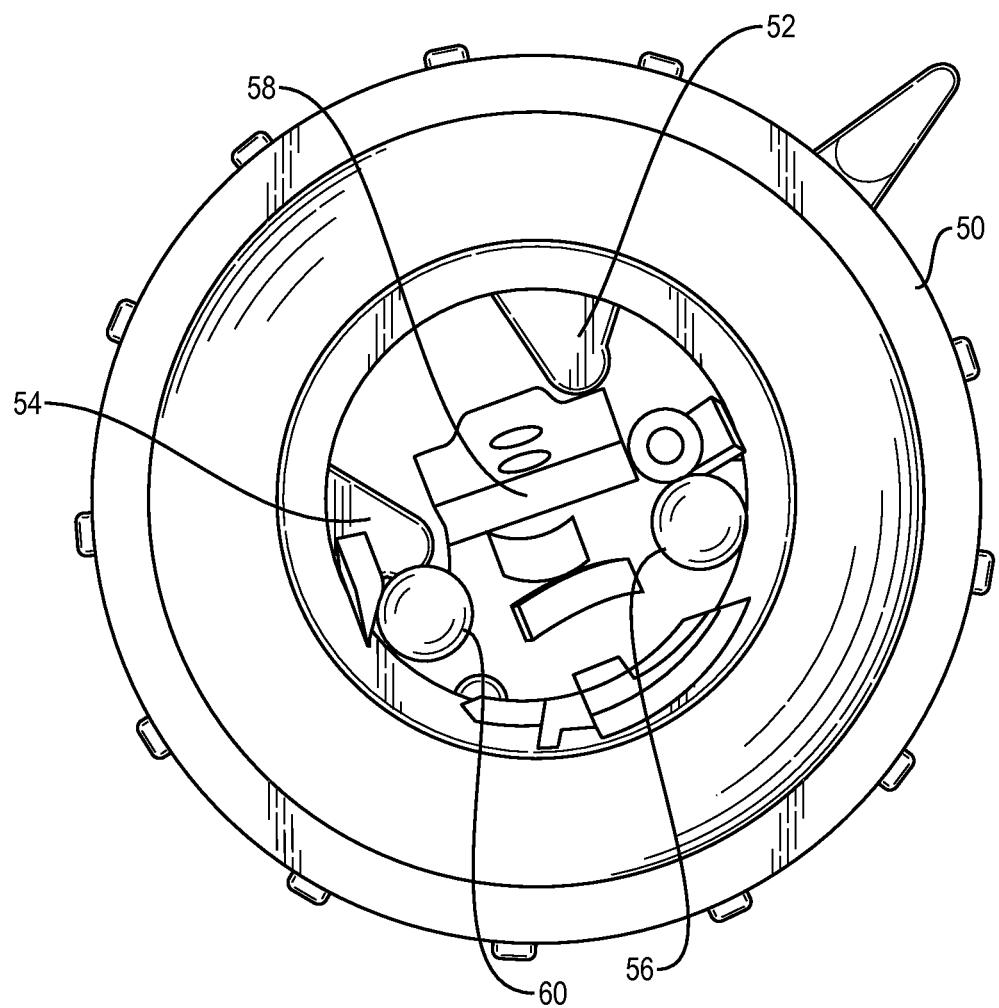
FIG. 11 is a rear view of the rotatable collar and support block.

The collar 50 is best illustrated in FIG. 7. It contains two inwardly facing tube compression protrusions 52 and 54, which selectively pinch closed the supply tubes 42/44. In FIGS. 8 and 9, the collar 50 is rotated to a first rotational position so that protrusion 52 pinches closed the supply tube 44 (i.e. against a rounded compression surface 56 of a support block 58 adjacent the supply tube 44). In this first rotation position, the liquid from pump 32 is supplied only to nozzle 46 of supply tube 42. In FIGS. 10 and 11, the collar 50 is rotated to a second rotation position so that protrusion 54 pinches closed the supply tube 42 (i.e. against a rounded compression surface 60 of support block 58 adjacent the supply tube 42). In this second rotation position, the liquid from the pump 32 is supplied only to nozzle 46 of supply tube 44.

Figure 12:
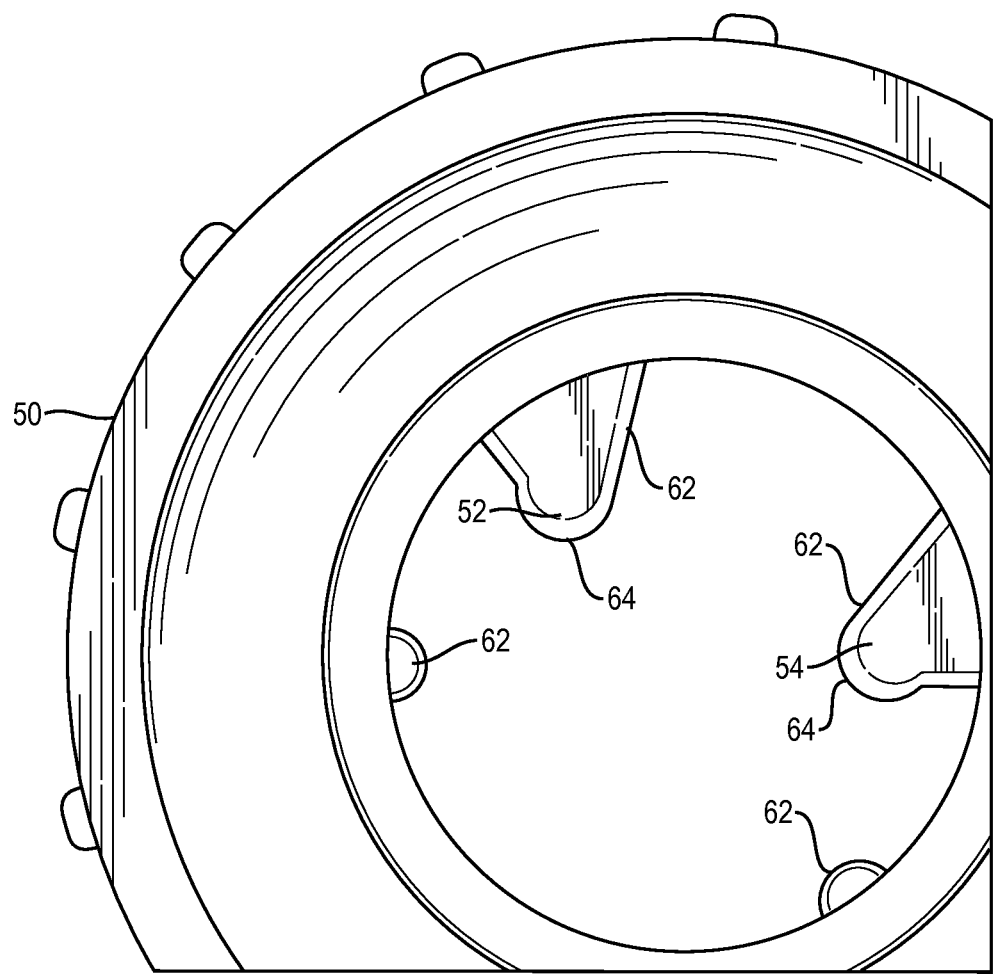
FIG. 12 is a partial rear view of the rotatable collar.

In a preferred embodiment as shown in FIG. 12, each tube compression protrusion 52/54 includes a straight leading edge 62 that terminates in a rounded end 64 (that matches the rounded shape of the corresponding rounded compression surface 56/60 of the support block 58). The rounded end 64 extends out slightly from the leading edge 62 and toward the supply tube 42/44 that it will pinch. It has been discovered that this shape is ideal for effectively pinching and sealing the supply tube 42/44 without dislodging or otherwise damaging the supply tube. Bumps 66 can also extend from the collar as shown in FIG. 12, where the bumps 66 engage complementary notches, holes or channels to provide tactile feedback to the user that the collar 50 is properly positioned to pinch closed the desired supply tube.

Figure 13:
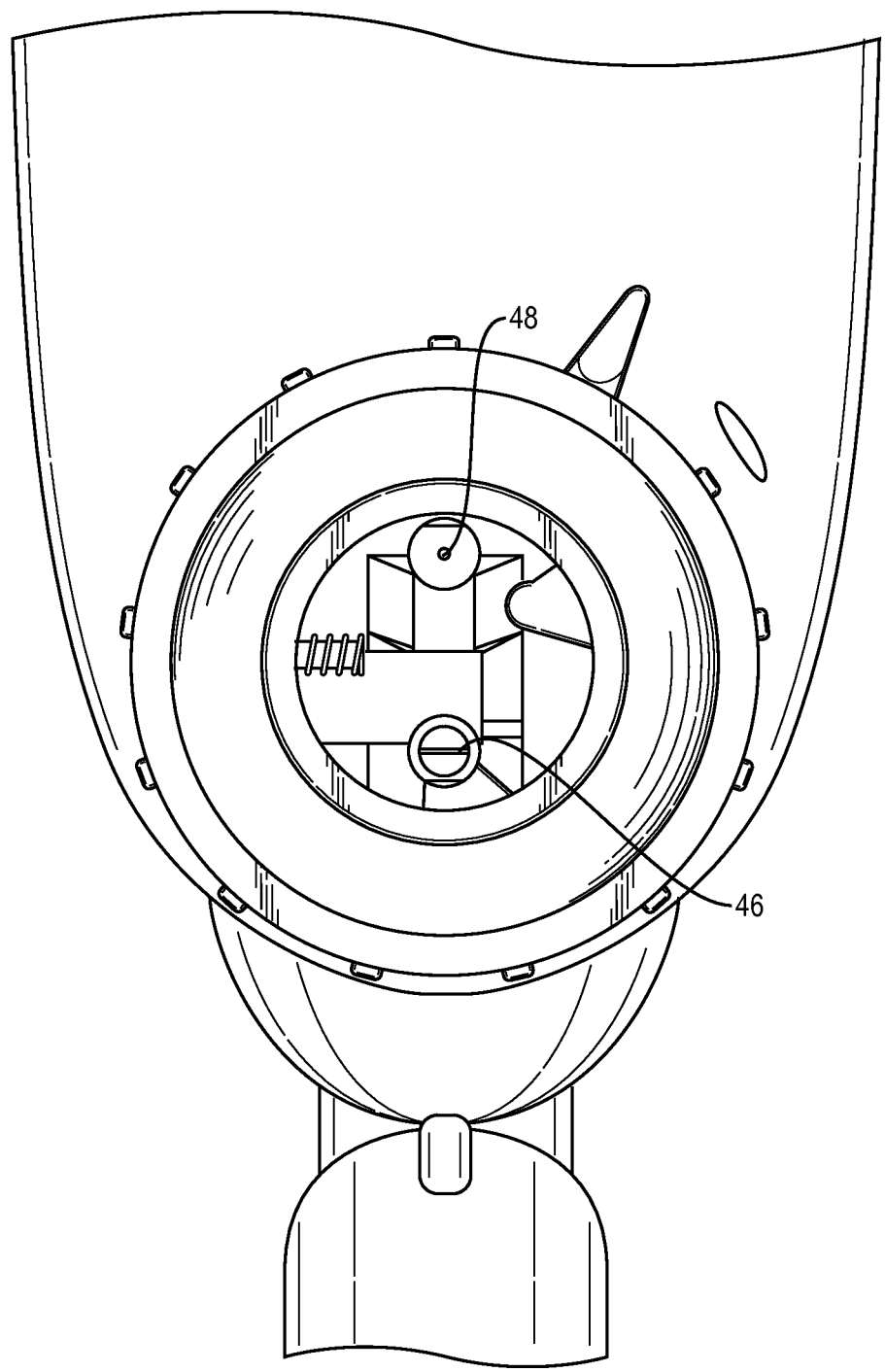
FIGS. 13-14 are front views of the rotatable collar and spray nozzles.
Figure 14:
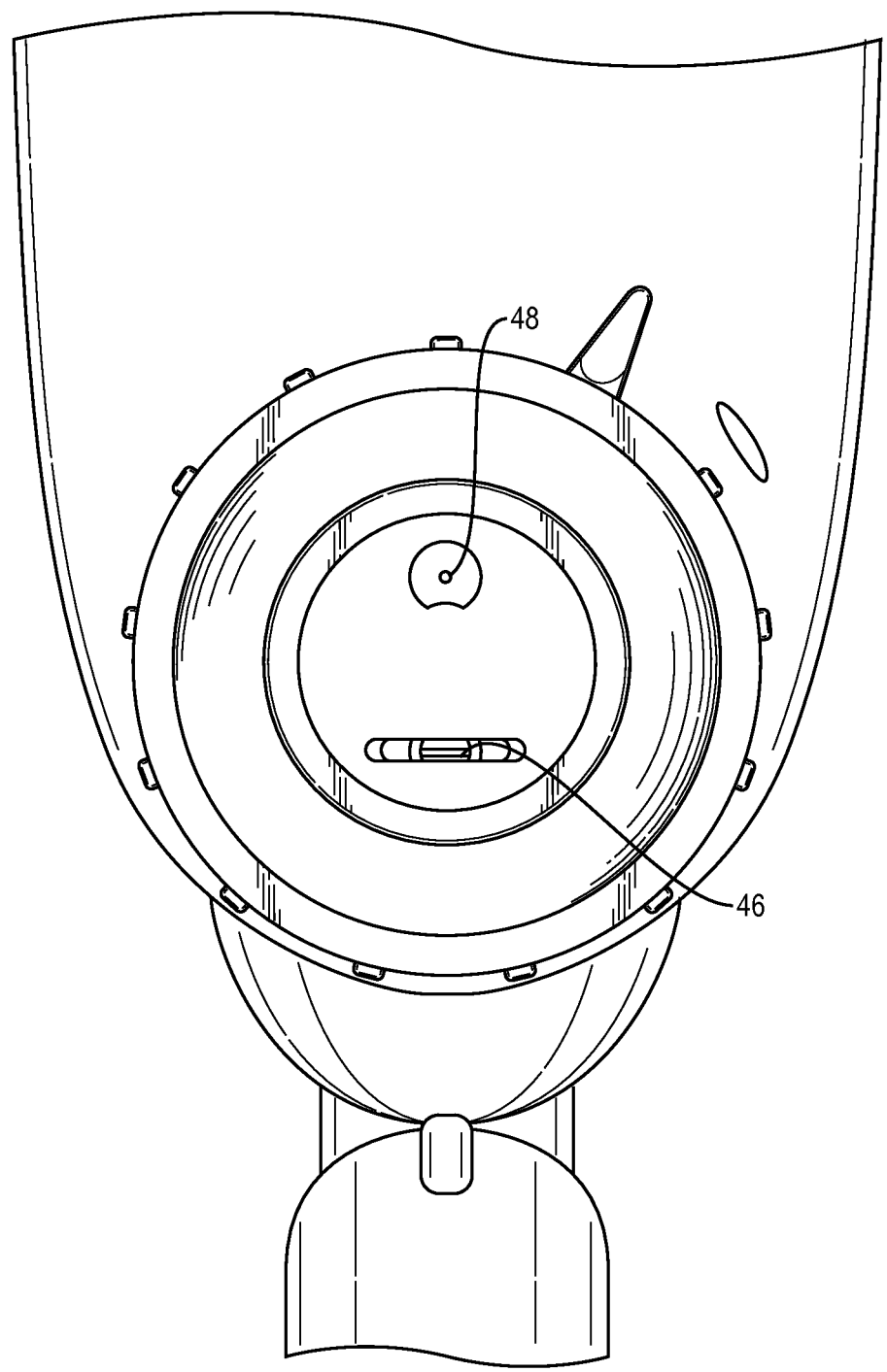

FIGS. 13 and 14 illustrate the two preferred nozzle types. The upper nozzle 48 has a narrow opening for creating a narrow output stream. The lower nozzle 46 has an elongated opening for creating a horizontally elongated output stream. Collar 50 can include a tab 68 extending therefrom to assist the user in rotating the collar 50, and for visually indicating the rotational position of the collar 50. Collar 50 is preferably rotatably supported by or connected to support block 50. However, collar 50 could alternately be rotatably supported by or connected to housing 19 of spray device assembly 18.

It is to be understood that the present invention is not limited to the embodiment(s) described above and illustrated herein, but encompasses any and all variations falling within the scope of the appended claims. For example, references to the present invention herein are not intended to limit the scope of any claim or claim term, but instead merely make reference to one or more features that may be covered by one or more of the claims. Materials, processes and numerical examples described above are exemplary only, and should not be deemed to limit the claims. A single protrusion can be used instead of two protrusions 52/54 to selectively pinch tubes 42/44. In the case of a single protrusion, or in the case with the proper spacing between protrusions 52/54, the user could rotate the collar to an intermediate rotation position (between the first and second rotation positions), where neither supply tube 42/44 is pinched, and thus both nozzles 46/48 can be operated simultaneously to provide two streams at the same time. Lastly, while two nozzles, two supply lines and two rotational positions are shown and described above, it is within the scope of the present invention to include three or more nozzles, supply lines and collar rotational positions.

What is claimed is:

1. A sprayer assembly, comprising:
a reservoir for storing liquid;
a pump in fluid communication with the reservoir;
first and second compressible supply tubes in fluid communication with the pump, wherein the pump is configured to draw liquid from the reservoir and discharge the liquid into the first and second supply tubes;
a first nozzle in fluid communication with the first supply tube;
a second nozzle in fluid communication with the second supply tube; and
a collar, the first and second supply tubes passing through the collar, and the collar having at least one protrusion extending radially inward and rotatable between a first position in which the at least one protrusion pinches closed the first supply tube but not the second supply tube, and a second position in which the at least one protrusion pinches closed the second supply tube but not the first supply tube.

2. The sprayer assembly of claim 1, wherein:
the at least one protrusion includes a first protrusion and a second protrusion;
the first protrusion pinches closed the first supply tube with the collar at the first position; and
the second protrusion pinches closed the second supply tube with the collar at the second position.

3. The sprayer assembly of claim 1, wherein a portion of the first supply tube is adjacent a first compression surface of a support block, and wherein the at least one protrusion pinches closed the first supply tube against the first compression surface with the collar at the first position.

4. The sprayer assembly of claim 3, wherein a portion of the second supply tube is adjacent a second compression surface of the support block, and wherein the at least one protrusion pinches closed the second supply tube against the second compression surface with the collar at the second position.

5. The sprayer assembly of claim 1, wherein:
a portion of the first supply tube is adjacent a first compression surface of a support block;
the at least one protrusion includes a first protrusion that pinches closed the first supply tube against the first compression surface with the collar at the first position;
the first protrusion includes a straight leading edge that terminates in a rounded end; and
the first compression surface has a concave shape that matches a shape of the rounded end.

6. The sprayer assembly of claim 5, wherein:
a portion of the second supply tube is adjacent a second compression surface of the support block;
the at least one protrusion includes a second protrusion that pinches closed the second supply tube against the second compression surface with the collar at the second position;
the second protrusion includes a straight leading edge that terminates in a rounded end; and
the second compression surface has a concave shape that matches a shape of the rounded end of the second protrusion.

7. The sprayer assembly of claim 1, wherein:
the first and second nozzles are configured to produce spray patterns that are different from each other.

8. The sprayer assembly of claim 7, wherein:
the first nozzle has a narrow opening for creating a narrow output stream of the liquid; and
the second nozzle has an elongated opening for creating an elongated output stream of the liquid.

9. The sprayer assembly of claim 1, wherein the collar is rotatable to a third position in which neither of the first and second supply tubes are pinched closed.

10. A sprayer assembly, comprising:
a reservoir for storing liquid;
a pump in fluid communication with the reservoir;
an output tube in fluid communication with the pump, wherein the pump is configured to draw liquid from the reservoir and discharge the liquid into the output tube;
first and second supply tubes in fluid communication with the output tube;
a first nozzle in fluid communication with the first supply tube;
a second nozzle in fluid communication with the second supply tube; and
a collar, the first and second supply tubes passing through the collar, and the collar having first and second protrusions extending radially inward and rotatable between a first position in which the first protrusion pinches closed the first supply tube, and a second position in which the second protrusion pinches closed the second supply tube.

11. The sprayer assembly of claim 10, wherein the first supply tube is not pinched closed with the collar in the second position, and wherein the second supply tube is not pinched closed with the collar in the first position.

12. The sprayer assembly of claim 10, further comprising:
a one-way valve disposed in the output tube.

13. The sprayer assembly of claim 10, wherein a portion of the first supply tube is adjacent a first compression surface of a support block, and wherein the first protrusion pinches closed the first supply tube against the first compression surface with the collar at the first position.

14. The sprayer assembly of claim 13, wherein a portion of the second supply tube is adjacent a second compression surface of the support block, and wherein the second protrusion pinches closed the second supply tube against the second compression surface with the collar at the second position.

15. The sprayer assembly of claim 10, wherein:
a portion of the first supply tube is adjacent a first compression surface of a support block;
the first protrusion pinches closed the first supply tube against the first compression surface with the collar at the first position;
the first protrusion includes a straight leading edge that terminates in a rounded end; and
the first compression surface has a concave shape that matches a shape of the rounded end.

16. The sprayer assembly of claim 15, wherein:
a portion of the second supply tube is adjacent a second compression surface of the support block;
the second protrusion pinches closed the second supply tube against the second compression surface with the collar at the second position;

the second protrusion includes a straight leading edge that terminates in a rounded end; and the second compression surface has a concave shape that matches a shape of the rounded end of the second protrusion.

17. The sprayer assembly of claim 10, wherein:

the first and second nozzles are configured to produce spray patterns that are different from each other.

18. The sprayer assembly of claim 17, wherein:

the first nozzle has a narrow opening for creating a narrow output stream of the liquid; and the second nozzle has an elongated opening for creating an elongated output stream of the liquid.

19. The sprayer assembly of claim 10, wherein the collar is rotatable to a third position in which neither of the first and second supply tubes are pinched closed.

* * * * *